(12) United States Patent
Endres et al.

(10) Patent No.: US 12,482,873 B2
(45) Date of Patent: Nov. 25, 2025

(54) BATTERY-COOLING APPARATUS, AND METHOD FOR DETECTING A THERMAL RUNAWAY OF A BATTERY CELL VIA SAID BATTERY-COOLING APPARATUS

(71) Applicant: Bayerische Motoren Werke Aktiengesellschaft, Munich (DE)

(72) Inventors: Joseph Endres, Munich (DE); Sascha Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 18/409,284

(22) Filed: Jan. 10, 2024

(65) Prior Publication Data

US 2024/0234854 A1 Jul. 11, 2024

(30) Foreign Application Priority Data

Jan. 11, 2023 (DE) .................... 10 2023 100 517.0

(51) Int. Cl.
  *F28F 19/00* (2006.01)
  *B60L 58/26* (2019.01)
  *H01M 10/613* (2014.01)
  *H01M 10/625* (2014.01)
  *H01M 10/63* (2014.01)
  *H01M 10/6568* (2014.01)
  *G01L 9/00* (2006.01)

(52) U.S. Cl.
  CPC ............. *H01M 10/63* (2015.04); *B60L 58/26* (2019.02); *H01M 10/613* (2015.04); *H01M 10/625* (2015.04); *H01M 10/6568* (2015.04); *G01L 9/0051* (2013.01); *H01M 2200/20* (2013.01); *H01M 2220/20* (2013.01)

(58) Field of Classification Search
  CPC .. H01M 10/63; H01M 10/613; H01M 10/625; H01M 10/6568; H01M 2200/20; H01M 2220/20; B60L 58/26; G01L 9/0051
  USPC ........................................................ 165/11.1
  See application file for complete search history.

(56) References Cited

FOREIGN PATENT DOCUMENTS

DE   10 2018 120 111 A1   2/2020
WO   WO2021234422 A1 * 11/2021   .......... H01M 50/691

OTHER PUBLICATIONS

German-language Search Report issued in German Application No. 10 2023 100 517.0 dated Oct. 4, 2023, with partial English translation (14 pages).

* cited by examiner

Primary Examiner — Davis D Hwu
(74) Attorney, Agent, or Firm — Crowell & Moring LLP

(57) ABSTRACT

A battery-cooling apparatus for a motor vehicle includes a temperature-control circuit for circulation of coolant for temperature control of battery cells, a coolant expansion tank which is incorporated into the temperature-control circuit, and an excess-pressure-detection device which is arranged at least partially in and/or on the coolant expansion tank and which detects exceedance of a particular pressure in the coolant expansion tank. A method detects a thermal runaway of a battery cell via the battery-cooling apparatus.

4 Claims, 2 Drawing Sheets

BATTERY-COOLING APPARATUS, AND METHOD FOR DETECTING A THERMAL RUNAWAY OF A BATTERY CELL VIA SAID BATTERY-COOLING APPARATUS

CROSS REFERENCE TO RELATED APPLICATION

This application claims priority under 35 U.S.C. § 119 from German Patent Application No. 10 2023 100 517.0, filed Jan. 11, 2023, the entire disclosure of which is herein expressly incorporated by reference.

BACKGROUND AND SUMMARY OF THE INVENTION

The invention relates to a battery-cooling apparatus for controlling the temperature of battery cells for a motor vehicle. The invention furthermore relates to a method for detecting a thermal runaway of a battery cell via said battery-cooling apparatus. The invention also relates to a motor vehicle having such a battery-cooling apparatus or having a control device which is adapted to carry out such a method.

It is known that battery cells of drive batteries of electrified vehicles, that is to say vehicles which are able to be driven purely using battery electricity at least temporarily, can undergo a thermal runaway (so-called thermal event). Such a fault situation can occur for example if there is a short circuit in the battery cell. Such a fault situation can result in the battery cell overheating and outgassing, that is to say hot gases and substances escape from the interior of the battery cell.

Up until now, such thermal events have been detected for example via monitoring of a temperature of battery cells, a voltage of the battery cells and/or a pressure in the battery housing. In this case, it is not very easy for the presence of a thermal event to be inferred from the measurement values involved here.

It is an object of the present invention to provide an alternative detection of a thermal event. This object is achieved by a battery-cooling apparatus, by a method, and by a motor vehicle with such a battery cooling apparatus, in accordance with the independent claims. Advantageous refinements of the invention are the subject of the dependent claims.

According to an exemplary embodiment of the invention, a battery-cooling apparatus is provided for a motor vehicle that has a temperature-control circuit for circulation of coolant for temperature control of battery cells, and has a coolant expansion tank which is incorporated into the temperature-control circuit, wherein an excess-pressure-detection device is provided which is arranged at least partially in and/or on the coolant expansion tank and which detects exceedance of a particular pressure in the coolant expansion tank. The resulting advantage is that a simple detection of a thermal event can be realized in an inexpensive manner by the excess-pressure-detection device, which is situated outside the battery housing. Moreover, a detection possibility which is used independently for detecting the thermal event is consequently available.

According to a further exemplary embodiment of the invention, the excess-pressure-detection device has a rupturing membrane with an integrated electrical conductor from which a rupture-induced increase in electrical resistance, in particular a contact interruption, is able to be detected. Detection by means of a partially or completely interrupted conductor makes possible a particularly inexpensive and at the same time reliable detection.

The present invention furthermore provides a method for detecting a thermal runaway of a battery cell via a battery-cooling apparatus, comprising the steps of: providing a temperature-control circuit for temperature control of battery cells, wherein the temperature-control circuit has a coolant expansion tank; detecting an excess pressure in the coolant expansion tank, and determining that a thermal runaway of a battery cell is present if an excess pressure in the coolant expansion tank is present.

According to a further exemplary embodiment of the method, in the step of detecting an excess pressure, the excess pressure is detected via an increase in electrical resistance, in particular a contact interruption, of an electrical conductor, which is integrated into a rupturing membrane.

According to an exemplary embodiment of the invention, a battery-cooling apparatus is provided for a motor vehicle that has a temperature-control circuit for circulation of coolant for temperature control of battery cells, and has a coolant expansion tank which is incorporated into the temperature-control circuit. The battery-cooling apparatus furthermore has an excess-pressure-detection device which is arranged at least partially in and/or on the coolant expansion tank and which detects exceedance of a particular liquid fill level in the coolant expansion tank and which, from this, determines that an excess pressure is present. With this exemplary embodiment, instead of the excess pressure being directly detected, the presence of an excess pressure, and thus the presence of a thermal event, can be inferred via the fill level. In the event of a thermal event and the associated increase in the temperature of the coolant, the volume of the coolant in the temperature-control circuit, and thus also the liquid fill level in the coolant expansion tank, goes up. The same advantages can be achieved with this exemplary embodiment as with the exemplary embodiment in which the excess-pressure-detection device is provided and the excess pressure is directly detected.

According to an exemplary embodiment of the invention, a method is provided for detecting a thermal runaway of a battery cell via a battery-cooling apparatus, comprising the steps of: providing a temperature-control circuit for temperature control of battery cells, wherein the temperature-control circuit has a coolant expansion tank; detecting a liquid fill level in the coolant expansion tank, and determining that an excess pressure in the coolant expansion tank, and thus a thermal runaway of a battery cell, is present if the liquid fill level in the coolant expansion tank exceeds a particular threshold value. With this exemplary embodiment, too, instead of the excess pressure being directly detected, the presence of an excess pressure, and thus the presence of a thermal event, can be inferred via the fill level, as described above. The same advantages can be achieved with this method as with the method in which the excess pressure is directly detected.

The present invention furthermore provides a motor vehicle having such a battery-cooling apparatus or having a control device which is adapted to carry out such a method.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
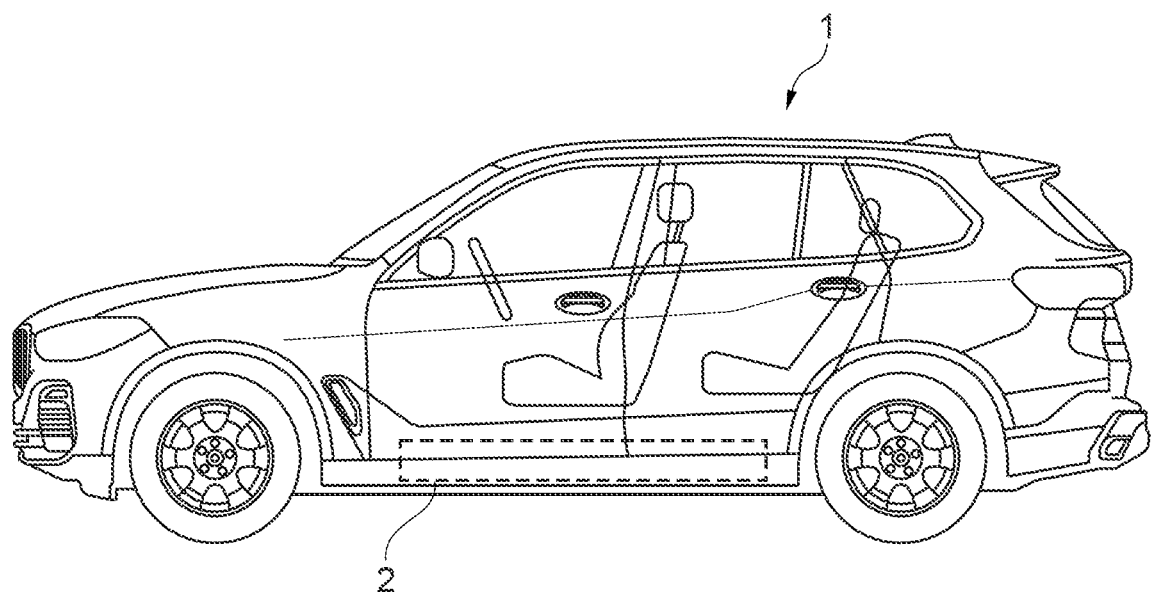
FIG. 1 schematically shows a motor vehicle.

FIG. 1 shows a motor vehicle 1 with a drive battery 2. The motor vehicle 1 is an electrified motor vehicle, that is to say a motor vehicle which is able to be driven purely using battery electricity at least temporarily. In particular, it is a passenger motor vehicle. The drive battery 2 has a multiplicity of battery cells 3 (see FIG. 2), which are electrically connected in series and/or in parallel with one another. The drive battery 2 stores electrochemically based electrical energy and provides this for the drive of the motor vehicle (that is to say one or more electric motors) and further vehicle consumers.

Figure 2:
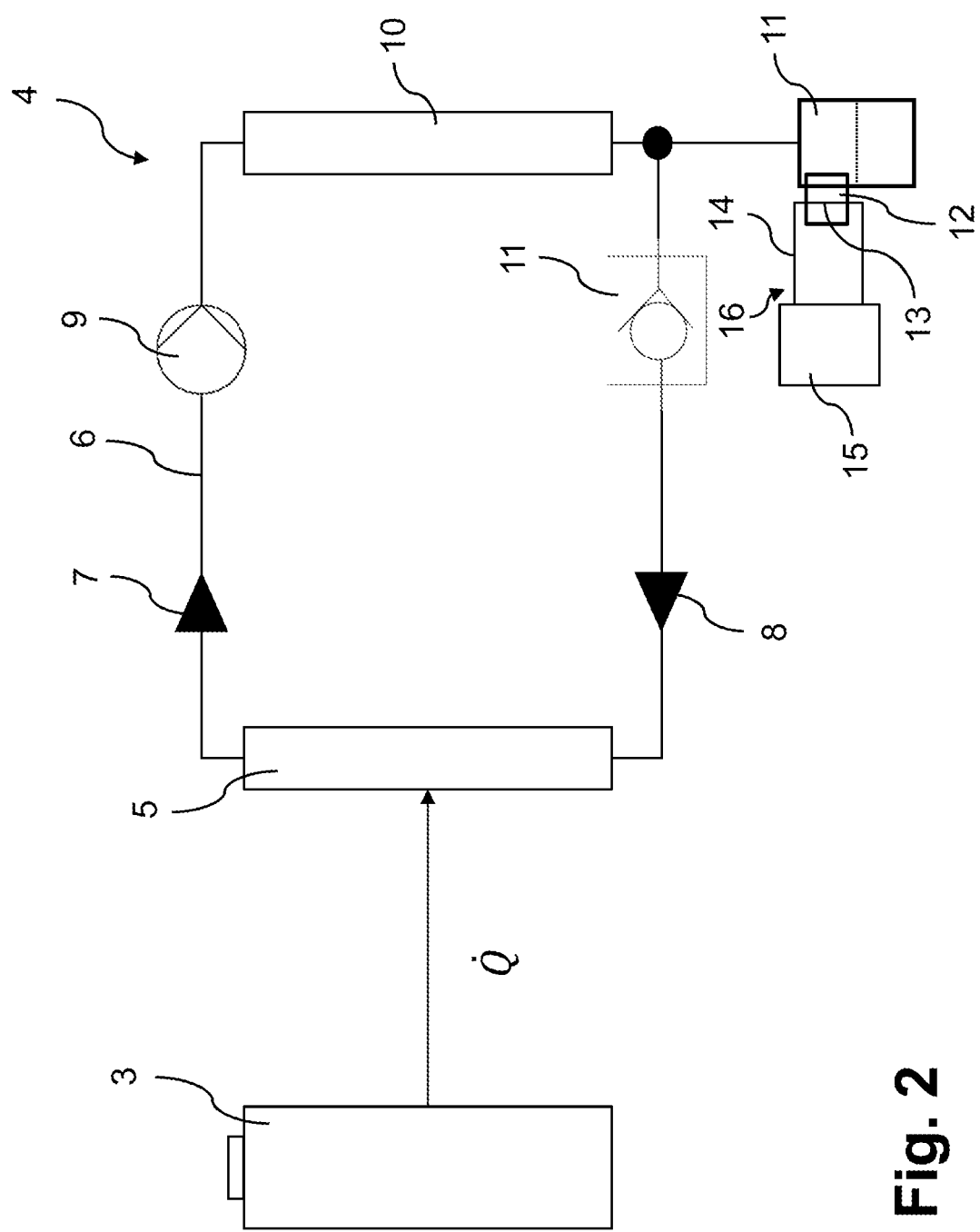
FIG. 2 schematically shows a battery cell with a battery-cooling apparatus according to an exemplary embodiment.

FIG. 2 schematically shows a battery cell 3 with a battery-cooling apparatus 4 according to an exemplary embodiment. The battery cell 3 is for example a rechargeable battery. For example, it is a lithium-ion battery cell. The battery cells 3 are thermally connected to a battery cooler 5 for temperature control, that is to say for cooling and/or heating, of the battery cells 3. The battery cooler 5 may have for example one or more plate-shaped coolers which are arranged above, below, to the side of or between the battery cells 3. The battery cooler 5 may also have undulating coolers which are arranged between battery-cell rows. The interior of the battery cooler 5 is able to be flowed through by coolant. The coolant is for example water provided with additives (for example glycol).

Both the battery cells 3 and the battery cooler 5 are housed by a battery housing. The battery cooler 5 is incorporated into a temperature-control circuit 6. The battery cooler 5 is connected via a coolant outlet 7 and a coolant inlet 8 to that part of the temperature-control circuit 6 which is arranged outside the battery housing.

Alternatively, the battery cells 3 could also immersion-cooled. In this alternative, no battery cooler 5 would be provided, but rather the battery cells 3 would be directly flowed around by coolant. In the case of this cooling, coolant would be introduced via the coolant inlet 8 from that part of the temperature-control circuit 6 arranged outside the battery housing into the battery housing and returned via the coolant outlet 7 from the battery housing into that part of the temperature-control circuit 6 arranged outside the battery housing. In the case of immersion cooling, it is more the case that dielectric coolants would be involved as the coolant.

The temperature-control circuit 6 comprises a closed circuit which is formed from lines and/or pipelines and in which the coolant is able to be circulated, so that the battery cells 3 are temperature-controllable, that is to say are heatable and/or coolable. The temperature-control circuit 6 furthermore has a pump 9 for conveying the coolant in the temperature-control circuit 6, has a heat exchanger 10 and has a one-way valve 20. The temperature-control circuit 6 illustrated here is a highly schematic illustration, and it is clear to a person skilled in the art that this may have further components and different interconnections. The heat exchanger 10 may be a liquid/air heat exchanger which, for example, releases heat to the surroundings of the motor vehicle 1. The heat exchanger 10 may be a liquid/liquid heat exchanger which releases heat energy to another circuit, for example a refrigerant circuit, or absorbs heat energy therefrom.

A coolant expansion tank 11 is moreover incorporated in the temperature-control circuit 6. Coolant expansion tanks 11 and the functioning thereof are known from the prior art. In the coolant expansion tank 11, coolant in liquid form is situated in the lower part while gas is situated in the upper part. These two phases are indicated by a dotted line in the coolant expansion tank. A rupturing membrane 12 is provided in and/or on the coolant expansion tank 11. The rupturing membrane 12 is closed in a fluid-tight manner during normal operation.

The rupturing membrane 12 is provided with an electrical conductor 13 such that, in the case of a rupture, the electrical conductor 13 is completely or partially interrupted, so that the electrical resistance increases or current can no longer flow through the electrical conductor 13. The electrical conductor is connected via an electrical circuit 14 to a control device 15, for example of a battery control unit. In this way, an excess-pressure-detection device 16 is provided which has at least the rupturing membrane 12 and the electrical conductor 13, and in particular the rupturing membrane 12, the electrical conductor 13, the electrical circuit 14 and the control device 15.

If, in a fault situation, there then occurs a thermal event in which one or more of the battery cells 3 undergo a thermal runaway, then this/these battery cell(s) generates/generate a great amount of heat energy, which is introduced via the battery cooler 5 into the temperature-control circuit 6. This results in the temperature of the coolant increasing. Consequently, the pressure in the interior of the coolant expansion tank 11 increases. If the pressure in the coolant expansion tank 11 exceeds a particular pressure such that an excess pressure prevails, then the rupturing membrane 12 ruptures. The particular pressure is thus established in advance by the design of the rupturing membrane 12. Rupturing of the rupturing membrane 12 results in the electrical conductor 13 being interrupted, which is able to be detected by the control device 15. The control device 15 can thus determine that, as a result of the interruption of the electrical conductor 13, a thermal event is present. Subsequently, the control device 15 can pass on this item of information accordingly such that vehicle occupants are warned and corresponding safety measures for the vehicle are initiated or taken.

As an alternative to the detection of the excess pressure by means of the rupturing membrane 12, it would be possible for provision to be made in the coolant expansion tank 11 of a pressure sensor, by way of which the exceedance of a particular pressure can be detected.

Moreover, an excess pressure could be indirectly inferred by way of detection of a liquid fill level in the coolant expansion tank, wherein, in the event of a particular fill level being exceeded, the presence of an excess pressure, and thus the presence of a thermal event, is inferred.

Whilst the invention has been illustrated and described in detail in the drawings and in the above description, this illustration and description is to be understood as being exemplary and not as being restrictive, and it is not intended to restrict the invention to the exemplary embodiment disclosed. The mere fact that particular features are mentioned in different dependent claims is not intended to indicate that a combination of these features could not also be used in an advantageous manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery-cooling apparatus for a motor vehicle, comprising:
a temperature-control circuit for circulation of coolant for temperature control of battery cells; and
a coolant expansion tank which is incorporated into the temperature-control circuit; and
an excess-pressure-detection device which is arranged at least partially in and/or on the coolant expansion tank and which detects exceedance of a defined pressure in the coolant expansion tank that determines a thermal runaway of a battery cell, wherein
the excess-pressure-detection device has a rupturing membrane with an integrated electrical conductor from which a rupture-induced increase in electrical resistance is able to be detected.

2. A method for detecting a thermal runaway of a battery cell via a battery-cooling apparatus, comprising:
providing a temperature-control circuit for temperature control of battery cells, wherein the temperature-control circuit has a coolant expansion tank;
detecting an excess pressure in the coolant expansion tank; and
determining that a thermal runaway of a battery cell is present when an excess pressure in the coolant expansion tank is present, wherein
in detecting an excess pressure, the excess pressure is detected via an increase in electrical resistance of an electrical conductor, which is integrated into a rupturing membrane.

3. A motor vehicle comprising a battery-cooling apparatus according to claim 1.

4. A motor vehicle, comprising:
a temperature-control circuit for circulation of coolant for temperature control of battery cells; and
a coolant expansion tank which is incorporated into the temperature-control circuit;
an excess-pressure-detection device which is arranged at least partially in and/or on the coolant expansion tank and which detects exceedance of a defined pressure in the coolant expansion tank, wherein
the excess-pressure-detection device has a rupturing membrane with an integrated electrical conductor from which a rupture-induced increase in electrical resistance is able to be detected; and
a control unit operatively configured to:
detect an excess pressure in the coolant expansion tank; and
determine that a thermal runaway of a battery cell is present when an excess pressure in the coolant expansion tank is present.

* * * * *